United States Patent [19]

Soma et al.

[11] Patent Number: 5,163,770
[45] Date of Patent: Nov. 17, 1992

[54] METHOD OF BONDING MEMBERS HAVING DIFFERENT COEFFICIENTS OF THERMAL EXPANSION

[75] Inventors: Takao Soma, Nagoya; Akihiko Yoshida, Iwakura, both of Japan

[73] Assignee: NGK Insulators, Ltd., Japan

[21] Appl. No.: 504,697

[22] Filed: Apr. 5, 1990

Related U.S. Application Data

[63] Continuation of Ser. No. 228,765, Aug. 4, 1988, abandoned, which is a continuation of Ser. No. 933,908, Nov. 24, 1986, abandoned.

[30] Foreign Application Priority Data

Dec. 11, 1985 [JP] Japan .................. 60-276941

[51] Int. Cl.$^5$ .................. F16C 9/00; B32B 9/06; B23K 31/00
[52] U.S. Cl. .................. 403/29; 403/30; 403/270; 428/450; 228/124; 228/125; 228/263.12
[58] Field of Search .................. 403/404, 30, 29, 28, 403/265, 270, 271; 228/122, 124, 263.12, 125; 428/81, 212, 450, 469

[56] References Cited

U.S. PATENT DOCUMENTS

| | | | |
|---|---|---|---|
| 2,139,431 | 12/1938 | Vatter | 228/121 |
| 2,604,087 | 7/1952 | Gregory et al. | 228/122 X |
| 2,657,961 | 11/1953 | Von Lassberg | 29/156.5 R |
| 3,063,144 | 11/1962 | Palmour, III | 228/124 |
| 3,065,533 | 11/1962 | Dungan et al. | 228/121 |
| 3,302,961 | 2/1967 | Franklin | 228/124 X |
| 3,314,140 | 4/1967 | Albright | 228/121 |
| 3,549,337 | 12/1970 | Palmer | 228/121 X |
| 3,893,224 | 7/1975 | Besson | 228/124 |
| 4,123,199 | 10/1978 | Shimizu et al. | 416/241 B |
| 4,648,308 | 3/1987 | Matsui et al. | 29/156.5 R |
| 4,778,345 | 10/1988 | Ito et al. | 416/241 B |

FOREIGN PATENT DOCUMENTS

| | | |
|---|---|---|
| 3240224 | 3/1984 | Fed. Rep. of Germany ... 123/193 P |
| 3506069 | 9/1985 | Fed. Rep. of Germany . |
| 3510940 | 10/1985 | Fed. Rep. of Germany . |
| 3511836 | 10/1986 | Fed. Rep. of Germany ... 123/193 P |
| 30206 | 9/1970 | Japan .................. 228/121 |
| 139077 | 6/1988 | Japan . |
| 2028464 | 3/1980 | United Kingdom ............ 123/193 P |
| 2158185 | 11/1985 | United Kingdom ............ 123/193 P |

OTHER PUBLICATIONS

*Fundamentals of Machine Component Design*, Robert C. Juvinall, John Wiley & Sons Inc., 1983, pp. 98–102.
*Mechanics of Materials*, Ferdinand P. Beer et al., McGraw-Hill Inc., 1981, pp. 80–84.
*Proceedings of the Society for Experimental Stress Analysis*, "Application of Stress Concentration Factors in Design", R. E. Peterson, 1943, vol. I, No. 1, pp. 118–127.
6001 Chemical Abstracts 103 (1985) Nov., No. 18, Columbus, Ohio, & JP 60-82267 5/1985.
6001 Chemical Abstracts vol. 94, (1981) & JP 55-121978 9/1980.
6001 Chemical Abstracts vol. 94, (1981) & JP 55-122667 9/1980.

Primary Examiner—Randolph A. Reese
Assistant Examiner—J. Russell McBee
Attorney, Agent, or Firm—Parkhurst, Wendel & Rossi

[57] ABSTRACT

A method of bonding at least two members having different coefficients of thermal expansion is disclosed, wherein an edge of a bonding interface between the members is positioned in a tapered portion, thereby bridging one member having a smaller coefficient of thermal expansion and another having a larger coefficient of thermal expansion. A bonded composite article comprising such bonded members having the different coefficients of thermal expansion is also disclosed.

18 Claims, 9 Drawing Sheets

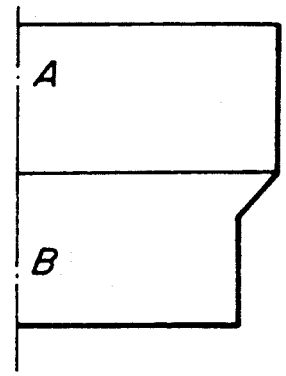
FIG_1a
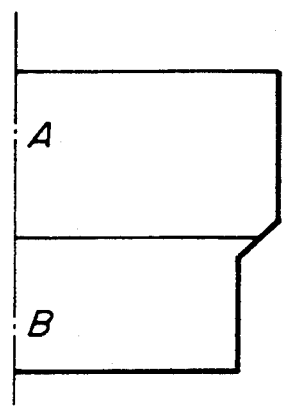
FIG_1b
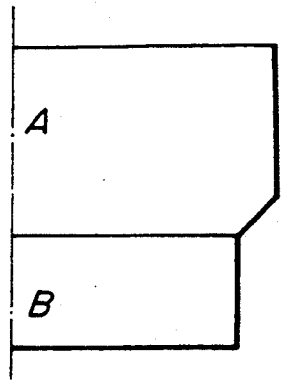
FIG_1c

FIG_3a
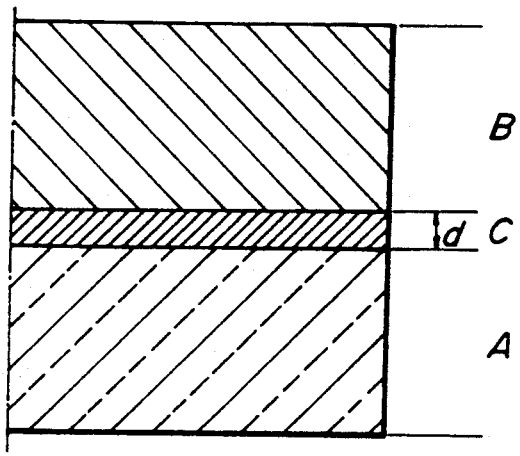
FIG_3b
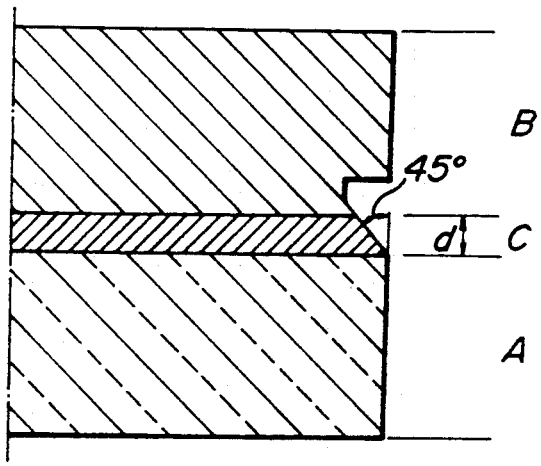

FIG_6a
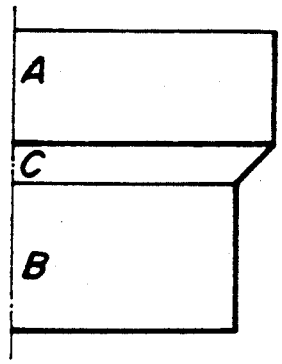
FIG_6b
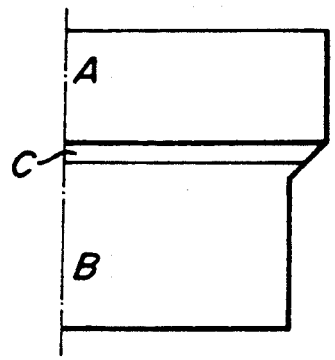
FIG_6c
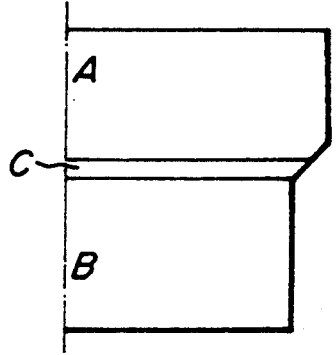
FIG_6d
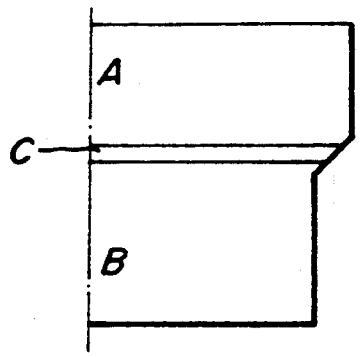
FIG_6e
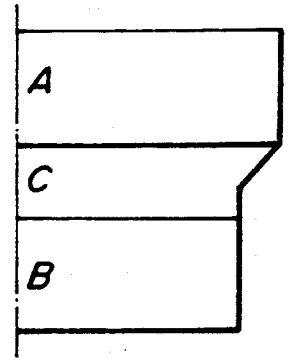

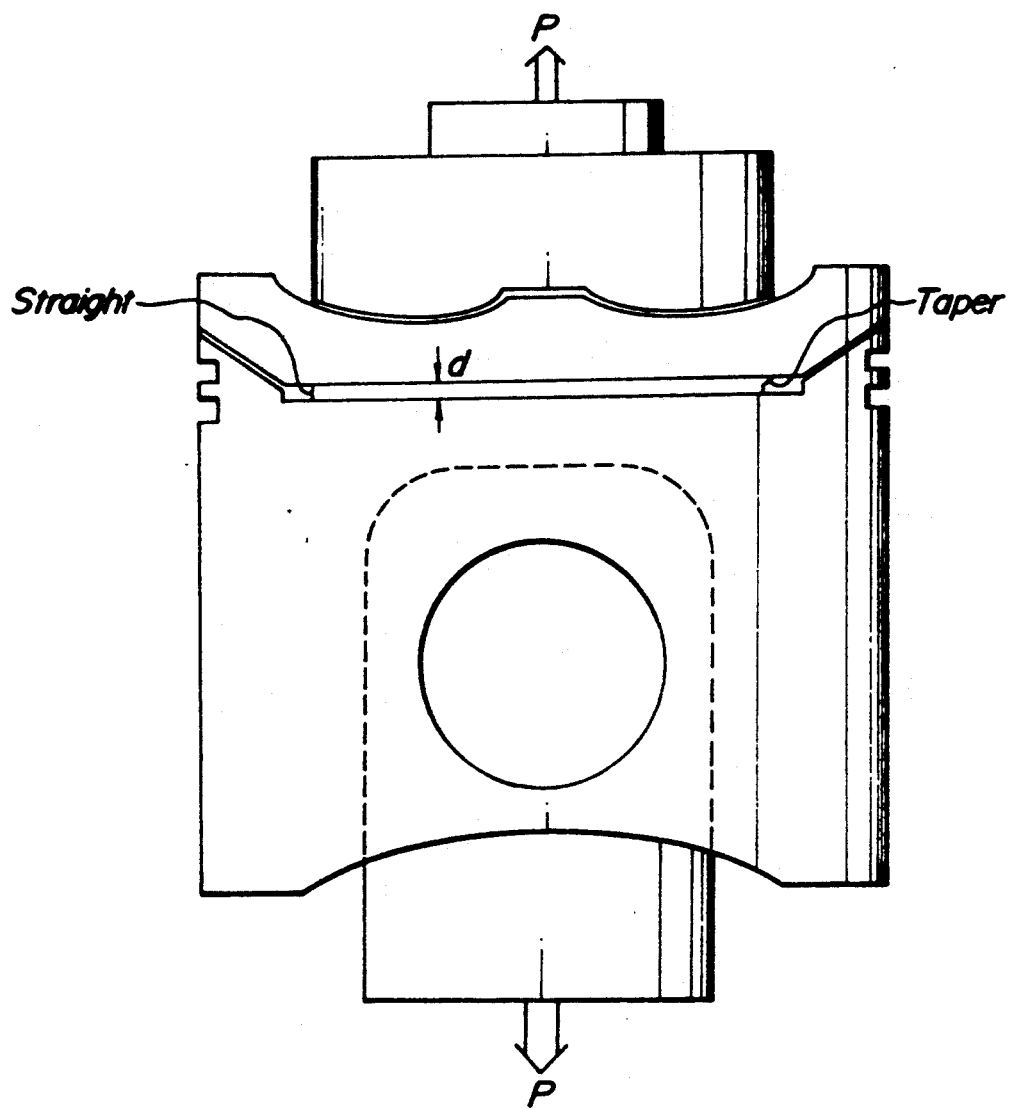

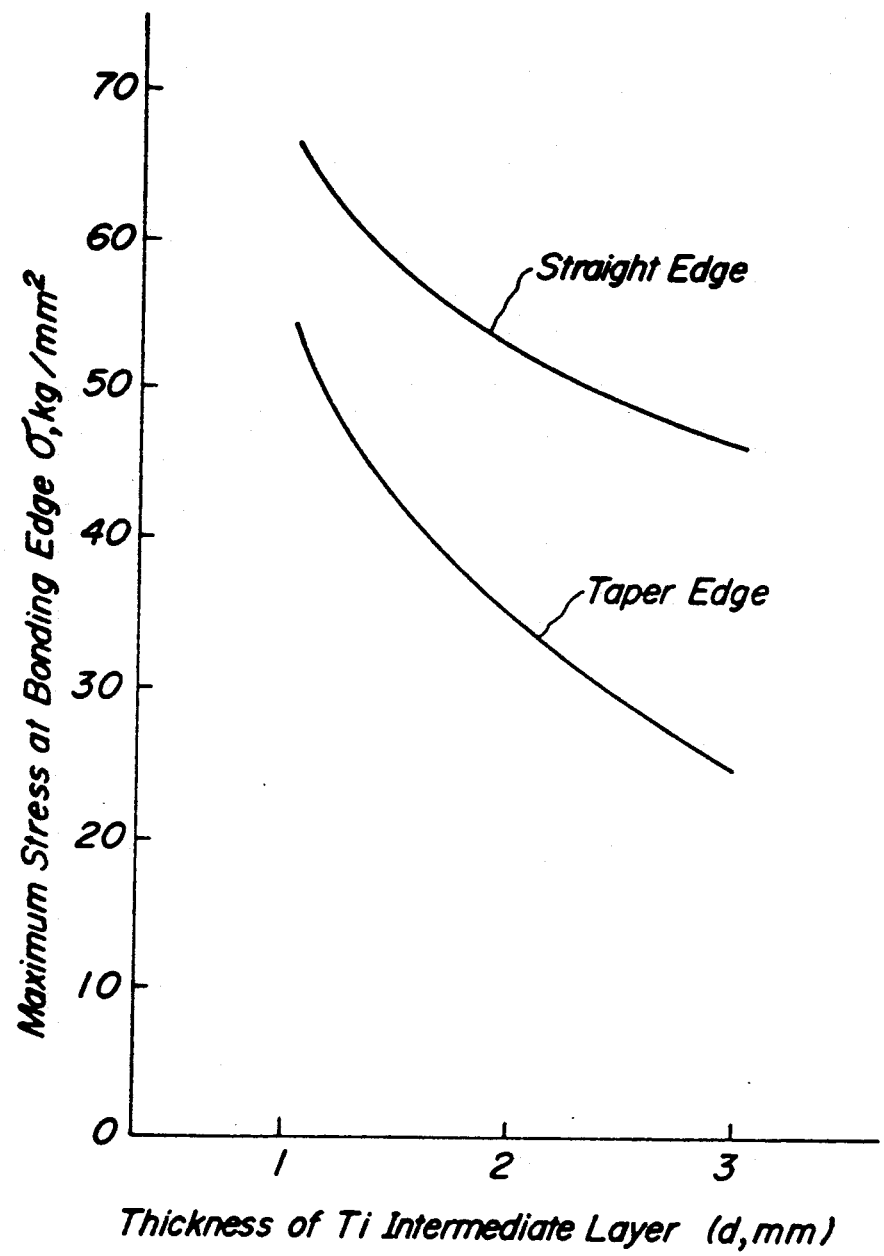

FIG_9
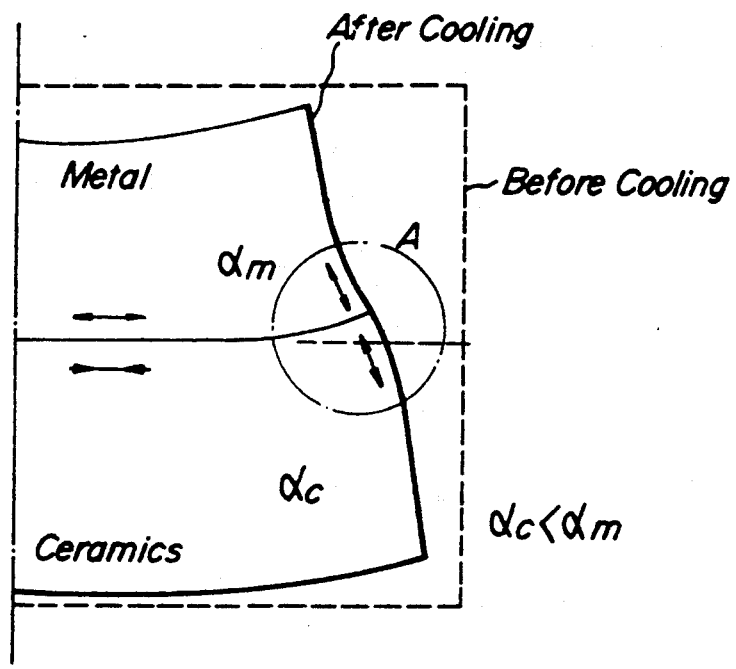

METHOD OF BONDING MEMBERS HAVING DIFFERENT COEFFICIENTS OF THERMAL EXPANSION

This is a continuation of Ser. No. 07/228,765 filed Aug. 4, 1988, now abandoned, which is a continuation of Ser. No. 06/933,908 filed Nov. 24, 1986, now abandoned.

BACKGROUND OF THE INVENTION

1. Field of the Invention

The present invention relates to a method of bonding members having different coefficients of thermal expansion. More particular, the invention relates to a suitable method of bonding a ceramic member and a metallic member.

2. Related Art Statement

As a method of bonding members having different coefficients of thermal expansion, there has been known a bonding method in which bonding is carried out while a separate intermediate layer is provided at an interface between the members. For instance, Japanese Utility Model Application Laid-open No. 59-160,533 discloses a method in which bonding is carried out while a cladding material made of W or Mo is interposed between a ceramic member and a metallic member as a bonding structure.

However, since a residual stress is developed at the bonding interface due to a difference in thermal expansion in the above-mentioned conventional method, sufficient bonding strength can not be obtained. Bonding of a metallic member and a ceramic member is by way of example explained with reference to FIG. 9. When a metallic member having a larger coefficient of thermal expansion and a ceramic member having a smaller coefficient of thermal expansion are bonded in a normal configuration prior to cooling and then are cooled, the metallic member undergoes a greater shrinkage, and as shown in FIG. 9, a tensile stress is imposed upon both the metallic member and the ceramic member at an end portion A of the interface. If such a state further proceeds, peeling or cracking sometimes takes place from the interface end portion A.

SUMMARY OF THE INVENTION

It is an object of the present invention to obviate the above-mentioned drawbacks, and to provide a method of bonding at least members having different coefficients of thermal expansion which method does not produce peeling or cracking at the end portion of the interface.

The present invention is directed to a method of bonding at least two members having different coefficients of thermal expansion, characterized in that an edge of a bonding interface between the members is positioned in a tapered portion, thereby bridging one member having a smaller coefficient of thermal expansion and the other having a larger coefficient of thermal expansion.

These and other objects, features and advantages of the present invention will be well appreciated upon reading of the following description of the invention when taken in conjunction with the attached drawings with the understanding that some modifications, variations and changes of the same could be done by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIGS. 1(a), (b) and (c) are diagrammatical views of embodiments of tapered portions in the bonding method according to the present invention;

FIGS. 3(a) and (b) are diagrammatical views of members having undergone a stress analysis;

FIGS. 6(a) to (e) are diagrammatical views of embodiments with an intermediate layer embodying the bonding method according to the present invention;

FIG. 7 is a diagrammatical view illustrating an embodiment in which the bonding method according to the present invention is embodied in a piston head;

FIG. 8 is a schematical view showing results of the stress analysis of the embodiment illustrated in FIG. 7; and FIG. 9 is a diagrammatical view illustrating the drawbacks possessed by a prior art bonding method.

DETAILED DESCRIPTION OF THE INVENTION

According to the present invention, since a tapered portion is provided at a bonding interface between the members having different coefficients of thermal expansion, bridging one member having a smaller coefficient of thermal expansion and the other member having a larger coefficient of thermal expansion, a tensile stress developed at an end portion of the interface due to difference in thermal expansion according to the conventional bonding method can be effectively avoided, thereby successfully preventing peeling and cracking at the interface end portion.

Forms of the tapered portions are shown by way of example in FIGS. 1(a), (b) and (c). As understood from these figures, the tapered portion may take any form so long as a taper is provided from the joining member A (member having a smaller coefficient of thermal expansion) toward the joining member B (member having larger coefficient of thermal expansion). The form shown in FIG. 1(a) is preferable.

The "tapered portion" used throughout the specification and claims is defined to mean that an area of a section obtained by cutting the tapered portion in parallel with the bonding interface becomes smaller from the member A to the member B. The section of the taper may be curved instead of "straight line" as shown in FIG. 1. Further, the shape of the joining surface of the member need not be circular, but a rectangular shape or a polygonal shape may also be employed.

EXAMPLES

The bonding method according to the present invention will be explained in more detail with reference to the following specific examples which are merely given in illustration thereof and should not be interpreted to limit the scope of the invention.

Figure 2A:
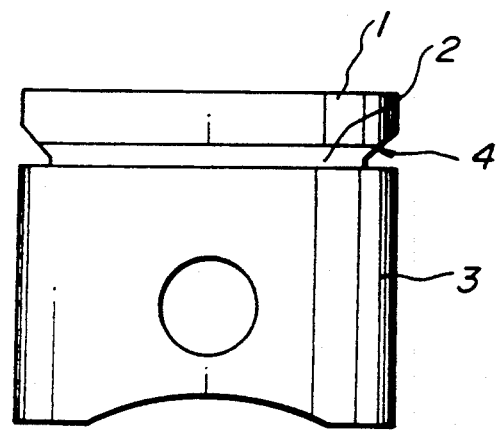
FIGS. 2(a) and (b) are diagrammatical views showing embodiments in which the bonding method according to the present invention is embodified in actual members.

FIGS. 2(a) and (b) are diagrammatical views showing embodiments in which the bonding method according to the present invention is embodied in actual members. FIG. 2(a) is an embodiment in which the bonding method is embodied in a piston cap. The piston cap 1 made of partially stabilized zirconia is bonded to a piston body 3 made of nodular graphite cast iron through an intermediate layer 2 made of Ti. In this embodiment, a tapered portion 4 is provided bridging piston cap 1 and the intermediate layer 2 to liberate stress.

Figure 2B:
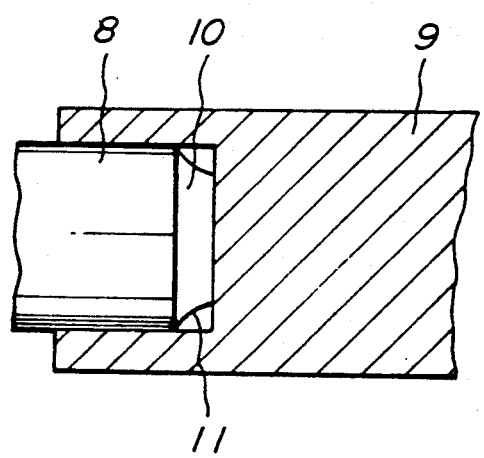

FIG. 2(b) is an embodiment in which the bonding method according to the present invention is embodied in a rotary shaft of a turbo charger rotor, a gas turbine rotor, etc. A shaft portion 8 of a rotary vane made of silicon nitride is bonded to a rotary shaft 9 made of a metal through an intermediate layer 10 made of Mo.

The bonding method according to the present invention can be applied to any members so long as their coefficients of thermal expansion differ from each other. In particular, the bonding method according to the present invention is effective for the metallic member and the ceramic member as mentioned above. As the ceramic member used for this purpose, use may be made of silicon nitride, silicon carbide, sialon, zirconia, mullite, alumina, beryllia, etc. As the metallic member, use may be made of stainless steel, nodular graphite cast iron, nickel-chromium-molybdenum steel, chromium-molybdenum steel, aluminum-chromium-molybdenum steel, maraging steel, precipitation-hardenable type super alloy, etc. Further, it is preferable that a part or the whole part of the metallic member is hardened by precipitation hardening, nitriding, a high frequency quenching, or the like.

Next, results obtained in the stress analysis made to confirm the effects of the tapered portion will be explained. Adopting a straight edge shown in FIG. 3(a) and a tapered edge according to the present invention shown in FIG. 3(b) as an edge of an interface, the following two cases (1) and (2) were subjected to a stress analysis while the thickness "d" of the intermediate layer was varied.

| (1) | member A: | PSZ (partially stabilized zirconia) |
| | member B: | FCD (nodular graphite cast iron) |
| | member C: | Ti (titanium) |

In the above materials, the coefficient of thermal expansion increases in the order of Ti, PSZ, and FCD (Ti<PSZ<FCD). The coefficient of thermal expansion of Ti is very near to that of PSZ. The sample is a cylindrical shape of 40 mm in diameter in which the thickness of the portion A and the portion B is 10 mm.

| (2) | A: | SN (silicon nitride) |
| | B: | SACM (aluminum-chromium-molybdenium steel) |
| | C: | Mo (molybdenium) |

In this case, the coefficient of thermal expansion becomes larger in the order of SN, Mo and SACM (SN<MO<SACM).

Figure 4:
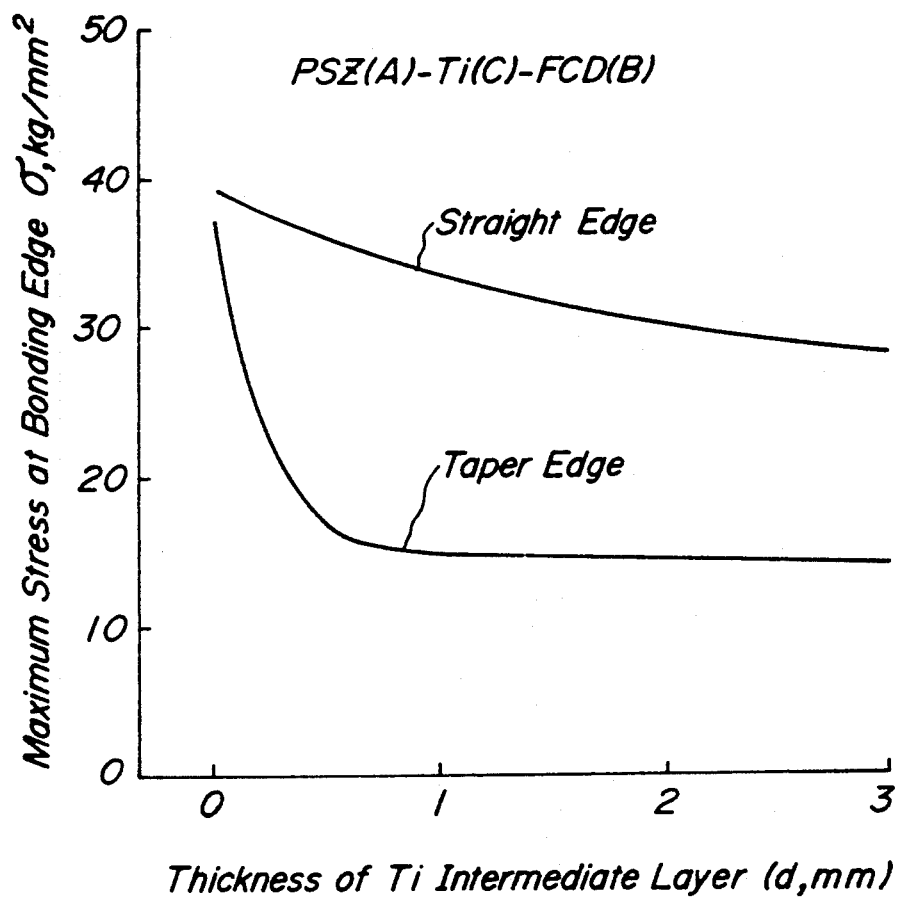
FIGS. 4 and 5 are graphs showing respective results of the stress analysis.
Figure 5:
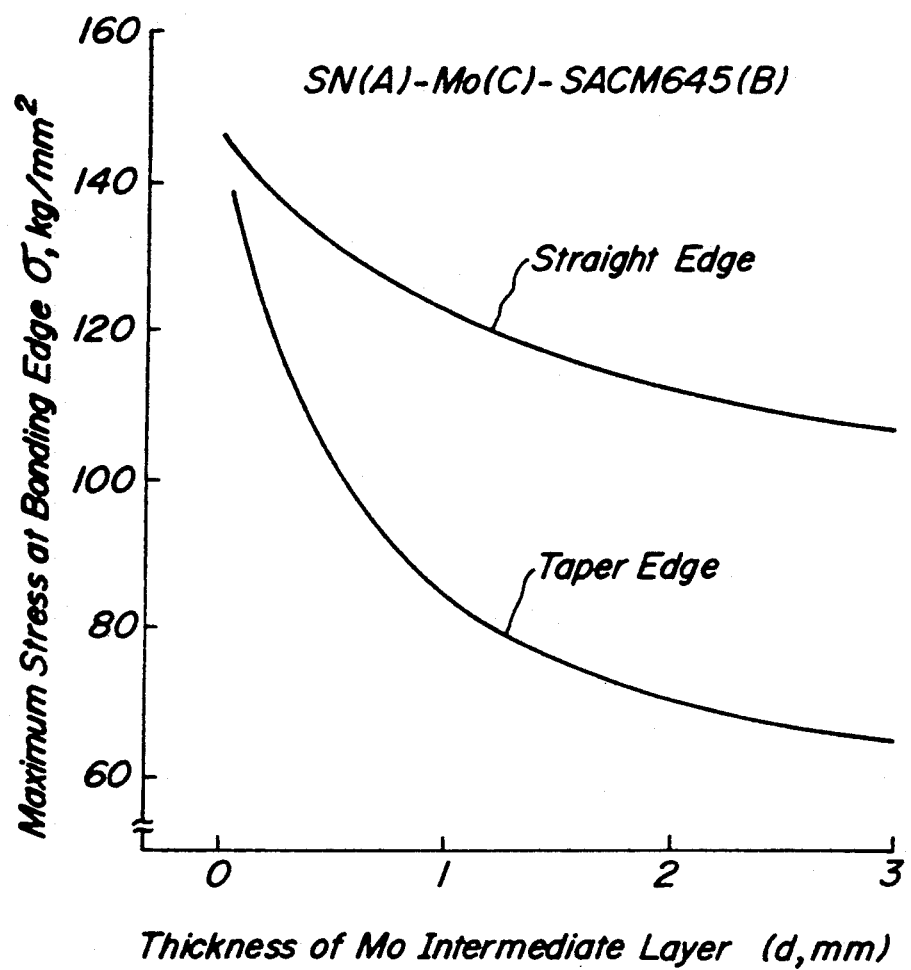

Results are shown in FIGS. 4 and 5. As obvious from the results in FIGS. 4 and 5, it was made clear in both cases that the taper edge sample according to the present invention was smaller in terms of the maximum stress at the bonding portion than the conventional straight edge sample and that stress at an edge of the bonding portion is favorably absorbed in the taper portion. Further, as compared with the samples in which the thickness of the intermediate layer is zero, that is, direct bonding is carried out through no intermediate layer, the sample provided with the intermediate layer effectively absorbed the stress at the bonding portion.

As mentioned above, the effect of the tapered portion is larger when the intermediate layer is interposed. When the intermediate layer C is intended to be interposed in the present invention, either one of the interface between A and C or the interface between B and C has only to be positioned on the taper. FIGS. 6(a) to (e) show embodiments in such a case.

The upper portion of a piston made of nodular graphite cast iron having a diameter of 120 mm shown in FIG. 7 was constituted by a piston cap made of partially stabilized zirconia (PSZ). Between the piston body and the piston cap was provided an intermediate layer made of Ti which was 2 mm thick and 80 mm in diameter. A conventional piston in which an edge of an intermediate layer was straight and a piston in which a tapered portion was provided in an edge of an intermediate layer were prepared. A tensile test jig was attached to each of the thus obtained pistons and a tensile test was carried out. Consequently, the piston cap of the conventional pistons having the straight edge intermediate layer was peeled or cracked in a range of P=500 to 2,000 kgf, while neither peeling nor cracking were produced at P=2,000 kgf in the case of the piston according to the present invention with the tapered edge intermediate layer. In FIG. 8 is shown results obtained in the stress analysis with respect to the straight edge type piston and the taper edge type piston having the configuration shown in FIG. 7.

As is well understood, the present invention is not limited to the above-mentioned embodiments, but various modifications, variations and changes are possible. For instance, although explanation has been made with respect to the bonding between the ceramic member and the metallic member, the bonding method according to the present invention may be applied to any bonding having different coefficients of thermal expansion.

What is claimed is:

1. A method of bonding at least two members, said members comprising a first member having a first thermal expansion coefficient and a second member having a second thermal expansion coefficient, said second thermal expansion coefficient being larger than said first thermal expansion coefficient, said method comprising:

butting said at least two members together at a common interface;

bonding said at least two members at said interface by at least one method selected from the group consisting of brazing, diffusion bonding, melting bonding, and combinations thereof; and forming a tapered portion in an outer periphery of said at least two members, said tapered portion including said interface between said members and occupying less than the entire outer periphery of said at least two members, said tapered portion being outwardly inclined from said second member towards said first member, said second member including a first portion spaced closely adjacent said interface, said first portion having a cross-sectional area which is not greater than the cross-sectional area of a portion of said second member contacting said first member at said interface, and said first member including a second portion spaced closely adjacent said interface, said second portion having a cross-sectional area which is substantially equal to the cross-sectional area of a portion of said first member contacting said second member at said interface;

wherein the forming step occurs before or after the bonding step and a final article formed according to this method includes said tapered portion, and said tapered portion mitigates thermal stresses induced in the final article during bonding.

2. A method according to claim 1, further comprising the steps of interposing an additional member having a coefficient of thermal expansion between said at least two members having the larger and smaller coefficients of thermal expansion.

3. A method according to claim 1, wherein the bonding is carried out while an additional member having a coefficient of thermal expansion near that of the member having the smaller coefficient of thermal expansion is interposed between the member having the smaller coefficient of thermal expansion and the member having the larger coefficient of thermal expansion.

4. A method according to claim 1, wherein the bonding is carried out while an additional member having a coefficient of thermal expansion near that of the member having the larger coefficient of thermal expansion is interposed between the members having the smaller and larger coefficients of thermal expansion.

5. A method according to claim 1, wherein a metal having a small rigidity is interposed between the member having the smaller coefficient of thermal expansion and the member having the larger coefficient of thermal expansion.

6. A method according to claim 1, wherein the members having the different coefficients of thermal expansion are a ceramic member and a metallic member.

7. A method according to claim 6, wherein the ceramic member is made of at least one member selected from the group consisting of silicon nitride, silicon carbide, sialon, zirconia, mullite, alumina, beryllia and combinations thereof.

8. A method according to claim 6, wherein a portion of the metallic member is hardened by at least one treatment selected from the group consisting of precipitation hardening, nitriding, high frequency quenching, and combinations thereof.

9. A method according to claim 6, wherein the metallic member is at least one member selected from the group consisting of stainless steel, nodular graphite cast iron, nickel-chromium-molybdenum steel, chromium-molybdenum steel, aluminum-chromium-molybdenum steel, maraging steel and combinations thereof.

10. A bonded composite article comprising at least two members bonded together at a common interface by at least one method selected from the group consisting of brazing, diffusion bonding, melting bonding, and combinations thereof, said at least two members comprising a first member having a first thermal expansion coefficient and a second member having a second thermal expansion coefficient, said second thermal expansion coefficient being larger than said first thermal expansion coefficient, said article having a tapered portion formed in an outer periphery thereof, said tapered portion including said interface and occupying less than the entire outer periphery of said at least two members, said tapered portion being outwardly inclined from said second member towards said first member, said second member including a first portion spaced closely adjacent said interface, said first portion having a cross-sectional area which is not greater than the cross-sectional area of a portion of said second member contacting said first member at said interface, and said first member including a second portion spaced closely adjacent said interface, said second portion having a cross-sectional area which is substantially equal to the cross-sectional area of a portion of said first member contacting said second member at said interface;

wherein said tapered portion mitigates thermal stresses induced in the composite article during bonding.

11. An article according to claim 10, wherein said members are bonded together while an additional member having a coefficient of thermal expansion between said at least two members having the larger and smaller coefficients of thermal expansion is interposed between the member having the smaller coefficient of thermal expansion and the member having the larger coefficient of thermal expansion.

12. An article according to claim 10, wherein said members are bonded together while an additional member having a coefficient of thermal expansion near that of the member having the smaller coefficient of thermal expansion is interposed between the member having the smaller coefficient of thermal expansion and the member having the larger coefficient of thermal expansion.

13. An article according to claim 10, wherein said members are bonded together while an additional member having a coefficient of thermal expansion near that of the member having the larger coefficient of thermal expansion is interposed between the members having the smaller and larger coefficients of thermal expansion.

14. An article according to claim 10, further comprising a metal having a small rigidity interposed between the member having the smaller coefficient of thermal expansion and the member having the larger coefficient of thermal expansion.

15. An article according to claim 10, wherein the members having the different coefficients of thermal expansion are a ceramic member and a metallic member.

16. An article according to claim 15, wherein the ceramic member is made of at least one member selected from the group consisting of silicon nitride, silicon carbide, sialon, zirconia, mullite, alumina, beryllia and combinations thereof.

17. An article according to claim 15, wherein a portion of the metallic member is hardened by at least one treatment selected from the group consisting of precipitation hardening, nitriding, high frequency quenching, and combinations thereof.

18. An article according to claim 15, wherein the metallic member is made of at least one member selected from the group consisting of stainless steel, nodular graphite cast iron, nickel-chromium-molybdenum steel, chromium-molybdenum steel, aluminum-chromium-molybdenum steel, maraging steel and combinations thereof.

* * * * *